United States Patent [19]

Dietz et al.

[11] Patent Number: 5,248,774
[45] Date of Patent: Sep. 28, 1993

[54] INNER SALTS BASED ON AMMONIUM AND SULFONATE GROUPS OF PERYLENE-3,4,9,10-TETRACARBOXYLIC AND DERIVATIVES THEREOF

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 855,608

[22] Filed: Mar. 20, 1992

[30] Foreign Application Priority Data

Mar. 21, 1991 [DE] Fed. Rep. of Germany ....... 4109244

[51] Int. Cl.$^5$ .................. C09B 5/62; C09B 57/08; C09B 67/20; C09B 67/22
[52] U.S. Cl. ............................. 544/125; 106/236; 106/241; 106/490; 106/209; 106/176; 106/22 H; 523/101; 524/90; 546/37
[58] Field of Search ............... 546/37; 544/125; 106/490, 22, 236, 241; 524/90; 523/101

[56] References Cited

U.S. PATENT DOCUMENTS

| | | | |
|---|---|---|---|
| 2,171,843 | 3/1965 | Weissayer et al. | 546/37 X |
| 2,544,825 | 3/1951 | Coffey et al. | 546/37 X |
| 3,544,303 | 12/1970 | Swidler et al. | 546/37 X |
| 4,310,359 | 1/1982 | Ehashi et al. | 546/37 X |
| 4,517,270 | 5/1985 | Graser et al. | 546/37 X |
| 4,599,408 | 7/1986 | Spietschka et al. | 544/125 |
| 4,667,036 | 5/1987 | Iden et al. | 546/37 |
| 4,709,029 | 11/1987 | Spietschka et al. | 544/125 |
| 4,978,755 | 12/1990 | Babler | 546/37 |
| 5,013,627 | 5/1991 | Harnisch et al. | 546/37 X |

FOREIGN PATENT DOCUMENTS

| | | | |
|---|---|---|---|
| 1281609 | 10/1968 | Fed. Rep. of Germany | 546/37 |
| 0913900 | 12/1962 | United Kingdom | 546/37 |
| WO-A-9102032 | 2/1991 | World Int. Prop. O. | 544/125 |

OTHER PUBLICATIONS

Diatz et al, Chemical Abstracts, vol. 115, #116295x (1991).

Primary Examiner—Floyd D. Higel

[57] ABSTRACT

Perylenetetracarboxylic diimides which contain a radical in the same molecule on one imide nitrogen which acts as an anion but contain a radical on the other imide nitrogen which acts as a cation, and on this basis form inner salts, are available by reaction of sulfo-containing alkylamines with perylenetetracarboxylic monoanhydride monoalkylaminoalkylimides or by reaction of alkylaminoalkylamines with perylenetetracarboxylic monoanhydride monosulfoalkylimides. As a result of their characteristic structural principle, these novel perylene compounds have excellent dispersing properties, in particular for pigments of the same chemical classes of compounds and can even be used themselves as pigments (colorants) depending on the substituent.

10 Claims, No Drawings

INNER SALTS BASED ON AMMONIUM AND SULFONATE GROUPS OF PERYLENE-3,4,9,10-TETRACARBOXYLIC AND DERIVATIVES THEREOF

The present invention relates to novel, valuable perylene compounds, which are present as inner salts and have the formula I

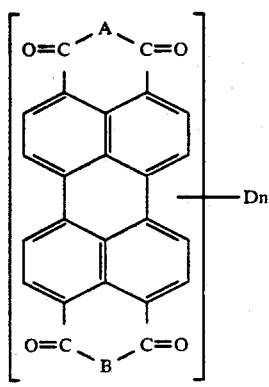

(I)

in which
A is a bivalent radical of the

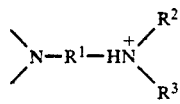

type of cationic nature and
B is a bivalent radical of the

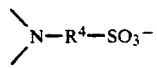

type of anionic nature, and
n is a value from 0 to 8, preferably from 1 to 6, and, if n is >0,
D is a chlorine or bromine atom and, if n is >1, may be a combination thereof,
in which in the above radicals A and B
$R^1$ is an alkylene group having 1-12 carbon atoms, preferably 2-6 carbon atoms, an aralkylene group or an arylene group, preferably phenylene,
$R^2$ and $R^3$ individually and independently of one another are each a hydrogen atom, a substituted or unsubstituted alkyl radical having 1-20 carbon atoms, preferably 1-6 carbon atoms, or a substituted or unsubstituted alkenyl radical having 2-20 carbon atoms but both are not simultaneously hydrogen, or
$R^2$ and $R^3$ jointly and together with the adjacent nitrogen atom form a heterocyclic system which, if desired, contains further hetero atoms such as an oxygen, sulfur and/or nitrogen atom belonging to the ring and to which, if desired, additional rings are fused on, and
$R^4$ is a straight-chain or branched alkylene group having 1-12 carbon atoms, preferably 1-6 carbon atoms.

Of particular interest are according to the invention the compounds of the formula I in which the meanings for symbols A and B and D and n are as defined above, in which, however, within the structural principle for radicals A and B
$R^1$ is an ethylene or propylene group,
$R^2$ and $R^3$, individually and independently of one another, are each an ethyl, propyl or butyl radical which, if desired, additionally contains nonionic substituents, these two radicals $R^2$ and $R^3$ being preferably the same, or
$R^2$ and $R^3$ jointly and together with the adjacent nitrogen atom form a heterocyclic five- or six-membered ring of aliphatic nature each having 1 to 3 identical or different hetero atoms (mainly nitrogen) belonging to the ring, such as, for example, of the pyrrolidine, piperazine and in particular piperidine or morpholine type, or
$R^2$ and $R^3$ form a corresponding hetero ring of aromatic nature in analogous manner, such as, for example, of the pyrrole, imidazoline and in particular imidazole type, and such a ring system in both cases contains nonionic substituents and in the case of heteroaromatics can also contain a benzo-fused ring, such as, for example, of the indole, indoline or benzimidazole type, and
$R^4$ is an ethylene or propylene group.

Owing to their immediate practical importance, very particular attention within the invention is paid to those inner salts of perylene compounds of the formula I in which the index n has the value zero, i.e. the halogen-free product of the claimed category.

The present invention also relates to a process for the preparation of the inner salts described above of perylene compounds of the formula I. These novel chemical products can be obtained by two basic process variants:

1) By condensation of perylene-3,4,9,10-tetracarboxylic monoanhydride monoimides which are substituted on the imide
nitrogen by a structural element of the

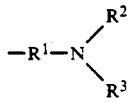

type, in which $R^1$, $R^2$ and $R^3$ have the abovementioned meaning, with sulfo-containing, primary aliphatic amines of the formula II $$H_2N-R^4-SO_3H \qquad (II),$$

in which $R^4$ is as defined above, for example with aminoalkanesulfonic acids, such as, in particular, taurine (2-aminoethanesulfonic acid) or salts thereof, the reaction of the starting materials being carried out in aqueous solution, under alkaline pH conditions, at temperatures in the range between 50° and 200° C., preferably at 100°-150° C. Advantageously, the sulfo-containing amines of the formula II are used in this reaction in excess.

2) By condensation of perylene-3,4,9,10-tetracarboxylic monoanhydride monoimides which are substituted on the imide nitrogen by a structural element of the $-R^4-SO_3H$ type, in which $R^4$ is as defined above, with alkylene- aralkylene- or arylenediamines having a primary amino group of the formula III

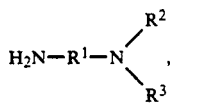

$$H_2N-R^1-N\begin{matrix}R^2\\R^3\end{matrix}, \qquad (III)$$

in which $R^1$, $R^2$ and $R^3$ have the abovementioned meaning, for example N-alkylamino- or N,N-dialkylaminoalkylamines, the reaction of the starting materials being carried out in aqueous solution, under alkaline conditions, at temperatures in the range between 50° C. and 200° C., preferably at 80°–120° C. The diamines of the formula III are advantageously used in excess.

Isolation of the process products formed by process variants 1) and 2) from the reaction mixture takes place by filtration of their salts, which are then converted into the inner salts of formula I by treatment with strong mineral acids, such as sulfuric acid.

The condensation of the two reactants by variant 2) can, instead of in aqueous medium, also be carried out in high-boiling, inert organic solvents, for example aromatic nitrogen heterocycles, such as pyridine, picoline, quinoline or imidazole, furthermore in aromatic hydrocarbons, such as benzene or naphthalene, or benzene substituted by alkyl, hydroxyl, alkoxy or halogen, in particular toluene, phenol, anisole, chlorobenzene, o-dichlorobenzene or 1,2,4-trichlorobenzene, or naphthalene substituted by alkyl or halogen, in particular the isomeric mixture diisopropylnaphthalene or α-chloronaphthalene, if appropriate with the addition of known catalysts (reaction accelerators), such as sulfuric acid, phosphoric acid or zinc salts, at temperatures in the range between 150° and 230° C., preferably at 180°–210° C. In this modified synthesis variant, the perylene compounds formed as salts are filtered off from the reaction mixture in the usual manner, if necessary after previous dilution thereof with inert organic solvents, for example aliphatic alcohols or aliphatic ketones, and then converted into the inner salts by treatment with mineral acids.

Halogenated inner salts of perylene compounds of the formula 1 where n is $>0$ are obtainable by condensation of the corresponding halogenated products (n$>$0) of the perylene-3,4,9,10-tetracarboxylic monoanhydride monoimides of any type mentioned above as starting compounds with sulfo-containing amines of the formula II or the diamine derivatives of the formula III; alternatively, they can be obtained by subsequent halogenation of already finished but halogen-free (n=0) process products of the formula I by reaction with elemental chlorine or bromine in highly concentrated sulfuric acid.

The properties of the claimed inner salts of perylene compounds of the formula I which have both anionic and cationic structural elements in the same molecule can be controlled to a large extent by a specific selection of the substituents $R^1$, $R^2$, $R^3$ and/or $R^4$ present on the two imide nitrogen functions or by the number n of halogen atoms D in the polycyclic system. The property profile of these novel compounds required for the particular area of application has to be adjusted and selectively optimized by orienting tests.

The inner salts according to the invention of perylene compounds of the formula I have proven to be valuable colorants. Depending on the nature and the resulting effectiveness of the substituents on the two imide nitrogen atoms, they can be used for this purpose directly as a pigment or else as a pigment dispersant.

The inner salts of such perylene compounds of the formula I directly usable for use as pigments can be provided in a transparent or in a covering pigment form. The condensation products of this type formed in the synthesis are inherently transparent but can be converted into a more covering pigment form by selection of the finishing conditions and the finishing medium by heating the moist crude pigment in water or organic solvent under pressure.

When used as dispersants for the preparation of pigment preparations, the compounds of the formula I obtained by this invention are mixed with the base pigments for the purpose of modifying the surface structure thereof by uniform coating. Preferably, this is done in conjunction with known perylene pigments, for example Pigment Red 224, Pigment Brown 26, Pigment Red 179, Pigment Red 189, Pigment Red 149, Pigment Red 190, Pigment Red 123 or Pigment Red 178. However, it is also possible to produce in this manner preparations containing base pigments of different chemical origin, such as azo and quinacridone pigments. The amounts of pigment dispersants to be added for this purpose to the base pigments are, as long as the desired pigment quality is not adversely affected, not limited towards a certain maximum value, although in general a suitable content is from 0.1 to 20% by weight, in particular 1 to 10% by weight of dispersant, calculated in relation to the particular pigment weight.

The pigment preparations produced by participation of the inner salts of perylene compounds of the formula I can contain, in addition to pigment and pigment dispersants, further components, such as, for example, surfactants, resins or dustproofing agents.

In the present case, the pigment preparations can be produced in various ways. Thus, the pigment dispersants can be added at a stage as early as the pigment synthesis, during a comminution process or during a subsequent solvent finishing treatment. The addition of the pigment dispersants can, for example, take place during dry milling of a crude pigment in the presence or absence of additional milling auxiliaries in a roller or vibrating mill or during wet milling of a crude pigment in an aqueous, aqueous-organic or organic milling medium, for example in a bead mill. The addition of the pigment dispersants before or during a print finish for the base pigment in an aqueous, aqueous-acidic or aqueous-organic medium has also proven to be suitable. The pigment dispersants can also be added to and incorporated in the water-moist pigment press cake before drying. Finally, it is possible to mix dry mixtures of the milled pigment dispersants with the pigment powder.

The inner salts according to the invention of perylene compounds of the formula I which can be used directly as pigment and the pigment preparations obtainable therein in the function as dispersant are easily dispersible in many application media to high degrees of fineness. Dispersions of this type have high flocculation stability and show excellent rheological properties, even in the case of extensive pigmenting. They can be used to produce coatings and prints of high color strength, high gloss and high transparency and excellent fastness properties.

The compounds according to the invention of the formula I which can be used as pigments and pigment preparations can be used in particular for pigmenting (coloring) high-molecular-weight organic materials of natural or synthetic origin:

Examples of high-molecular-weight organic materials which can be colored using pigments or pigment preparations of this type are cellulose ethers and esters, such as ethylcellulose, nitrocellulose, cellulose acetate or cellulose butyrate, natural resins or synthetic resins, such as polymerization resins or condensation resins, for example amino resins, in particular urea/- and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures. It is irrelevant whether the high-molecular-weight organic compounds mentioned are present as plastic compositions, melts or in the form of spinning solutions, varnishes, paints or printing inks. Depending on the particular application, it has proven to be advantageous to use the pigments or pigment preparations as toners or in the form of preparations or dispersions. Based on the high-molecular-weight organic material to be pigmented, pigments or pigment preparations of this type are used in an amount of preferably 1 to 10% by weight.

Particularly preferred coating systems in this respect are baking enamels from the class of alkyd/melamine or acrylic/melamine varnishes and two-components varnishes based on acrylic resins crosslinkable with polyisocyanate. Of the large number of printing inks which can be pigmented, printing inks based on nitrocellulose may be mentioned in particular.

The pigments or pigment preparations based on the invention are also highly suitable as polymer-insoluble colorants for coloring moldable plastics, in particular for polyvinyl chloride, polyethylene and polypropylene. Colorations of high color strength and very good dispersibility are obtained.

In order to test the properties of pigments or pigment preparations of this type in the paint sector, an alkyd/melamine varnish (AM6) based on a medium-oil, nondrying alkyd resin comprising synthetic fatty acids and phthalic anhydride and on a melamine resin etherified with butanol and portions of a non-drying alkyd resin based on ricinenic acid (short-oil) and an acrylic baking enamel based on a non-aqueous dispersion (TSA) were selected from the large number of known systems. In the examples below, they are referred to as AM6 and TSA.

The rheology of the mill base after dispersion is evaluated on the following scale from one to five:

| 5 thin liquid | 2 slightly solidified |
| 4 liquid | 1 solidified |
| 3 thick liquid | |

After dilution of the mill base to the final pigment concentration, the viscosity was evaluated using the Rossmann viscospatula, type 301, from Erichsen.

Gloss measurements were carried out on cast films at an angle of 20° according to DIN 67530 (ASTMD 523) using the "multigloss" measuring device from Byk-Mallinckrodt.

In the examples below, parts and percentages of the substances thus described are by weight. The generic names used for identification of the pigments used according to the invention and the corresponding C.I. numbers are taken from COLOUR INDEX, 3rd edition 1971, volume 4, and supplements 1975, 1982 and 1987. The perylene-3,4,9,10-tetracarboxylic monoanhydride monosulfoethylimide or -propylimide used in the examples as starting material was prepared according to the International Patent Application WO 91/2032 and the perylene-3,4,9,10-tetracarboxylicmonoanhydridemono-N-alkylaminoalkylimides were prepared according to U.S. Pat. No. 4,599,408.

EXAMPLE 1

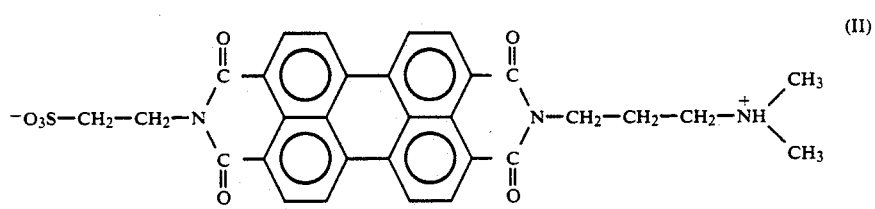

(II)

9.98 g of perylene-3,4,9,10-tetracarboxylic monoanhydride mono-β-sulfoethylimide (99.0% pure) are suspended in a stirred vessel in 300 ml of water, and 8.16 g of 3-dimethylaminopropylamine are added to this suspension, after which the batch is heated at 100° C. for 5 hours. After cooling to 25° C., 40 g of potassium chloride are additionally introduced, and the mixture is stirred at 25° C. for another 2 hours. The resulting product is then filtered off with suction, washed neutral with 10% potassium chloride solution and dried at 80° C.

The residue obtained is then first introduced at 25° C. into 100 g of 95% sulfuric acid and dissolved therein. Furthermore, 155 g of 48% sulfuric acid are then added dropwise to this solution, during which the temperature may rise to 80° C. The mixture is then allowed to cool to 25° C.; the precipitated salt is filtered off with suction through a sintered glass crucible, washed with 50% sulfuric acid, washed neutral with water and dried at 80° C.

Yield: 11.87 g of a compound having the abovementioned formula II and containing 6.9% of water of crystallization, which corresponds to 11.05 g 100% pure compound (=95.7% of theory).

Analysis: $C_{31}H_{25}N_3SO_7$. Taking into account 6.9% of $H_2O$. Calculated: C 63.8%, H 4.3%, N 7.2%, S 5.5%. Found: C 63.4%, H 4.0%, N 6.9%, S 5.6%.

$^1H$ NMR spectrum in $D_2SO_4$. Position of the chemical shift ($^1H$) 2.75; 3.1; 2.14; 4.16; 3.75; 4.79; 6.2.

EXAMPLE 1a 18.0 g of Pigment Red 179 (C.I. No. 71130), prepared analogously to U.S. Pat. No. 4,496,731 with the addition of 15% of resin soap are mixed mechanically with 2 g of the pigment dispersant of the above formula II.

This gives a pigment preparation which when tested by incorporation in TSA varnish produces transparent coatings of high color strength and high gloss. The mill base rheology of the composition is given a rating of 3–4.

Example 1a above is repeated, except that no pigment dispersant is added, giving a composition produced using the resulting product whose rheology only reaches a rating of 1.

EXAMPLE 2

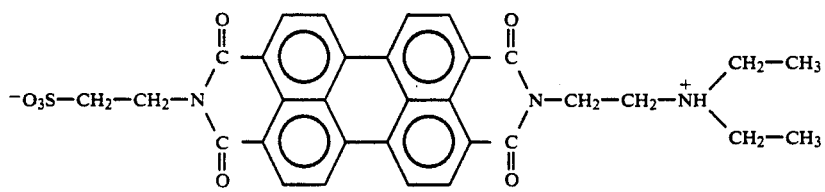

750 ml of water are initially introduced into an autoclave, and 26.3 g of taurine and 13.9 g of 85% potassium hydroxide are then fed in. 25.8 g of perylene-3,4,9,10-tetracarboxylic monoanhydride mono-β-diethylaminoethylimide are then introduced, the mixture is heated to 150° C. and additionally stirred at this temperature for 3 hours. After cooling to 25° C., the precipitated product is filtered off with suction, washed neutral with water and dried at 80° C.

The residue obtained is then first introduced at 25° C. into 300 g of 100% sulfuric acid and dissolved therein. In addition, 700 g of 15% sulfuric acid are then added dropwise to this solution, during which the temperature may rise to 80° C. The mixture is then allowed to cool to 25° C.; the precipitated salt is filtered off with suction through a sintered glass crucible, washed neutral with water and dried at 80° C.

Yield: 27.6 g of a compound having the abovementioned formula III which contains 3.0% of water of crystallization, which corresponds to 26.8 g of 100% pure compound (=85.4% of theory).

Analysis: $C_{32}H_{27}N_3SO_7$. Taking into consideration 3.0% of $H_2O$. Calculated: C 64.3%, H 4.5%, N 7.0%, S 5.4%. Found: C 64.0%, H 4.8%, N 6.4%, S 5.6%.

$^1$H NMR spectrum in $D_2SO_4$.

Position of the chemical shift ($^1$H) 1.2; 3.2; 3.4; 4.6; 3.75; 4.79; 6.18.

EXAMPLE 2a 150 ml of water are initially introduced into an autoclave, mixed with 15 g of the perylene compound of the above formula III, the mixture is then heated to 150° C. and additionally stirred at this temperature for 5 hours. After cooling to 25° C., the finished product is filtered off with suction, washed with water and dried at 80° C. This gives 13.2 g of a pigment which when incorporated in AM6 varnish produces covering coatings of pure, red shade and high gloss. The mill base rheology of the composition is given a rating of 5. The cross-coating fastness is excellent. The viscosity of the 5% varnish is 5.9″.

EXAMPLE 3

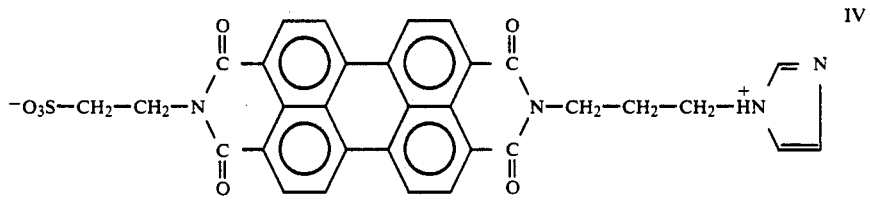

1,300 ml of water are initially introduced into an autoclave, and 47.8 g of taurine and 25.2 g of 85% potassium hydroxide are then fed in. 47.6 g of perylene-3,4,9,10-tetracarboxylic monoanhydride mono-γ-imidazolylpropylimide are then introduced, the mixture is heated to 150° C. and additionally stirred at this temperature for 3 hours. After cooling to 25° C., the precipitated product is filtered off with suction, washed neutral with water and dried at 80° C.

The residue obtained is then first introduced at 25° C. into 700 g of 100% sulfuric acid and dissolved therein. In addition, 1,600 g of 15% sulfuric acid are then added dropwise to this solution, during which the temperature may rise to 80° C. The mixture is then allowed to cool to 25° C.; the precipitated salt is filtered off with suction through a sintered glass crucible, washed neutral with water and dried at 80° C.

Yield: 53.5 g of a compound having the abovementioned formula IV which contains 2.2% of water of crystallization, which corresponds to 52.3 g of 100% pure compound (=90.5% of theory).

Analysis: $C_{32}H_{22}N_4SO_7$. Taking into consideration 2.2% of $H_2O$. Calculated: C 63.4%, H 3.6%, N 9.2%, S 5.3%. Found: C 62.8%, H 3.7%, N 9.2%, S 5.5%.

EXAMPLE 4

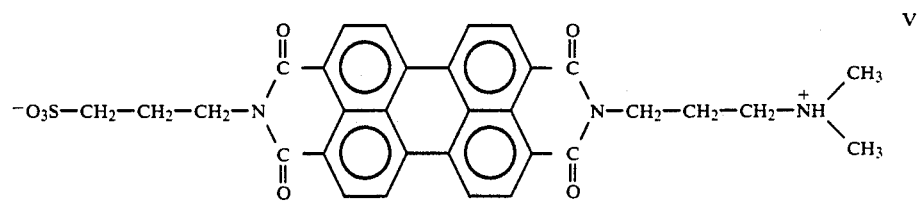

5.40 g of perylene-3,4,9,10-tetracarboxylic monoanhydride mono-γ-sulfopropylimide (94.0% pure) are suspended in a stirred vessel in 100 ml of water, and 4.10 g of 3-dimethylaminopropylamine are added to this suspension, after which the batch is heated at 100° C. for 5 hours. After cooling to 25° C., 20 g of potassium chloride are additionally introduced, and the mixture is stirred at 25° C. for 1 hour. The resulting product is then filtered off with suction, washed neutral with 10% po- Yield: 11.6 g of a compound having the abovementioned formula VI which contains 3.7% of water of crystallization, which corresponds to 11.2 g of 100% pure compound (=93.3% of theory).

Analysis: $C_{33}H_{29}N_3SO_7$. Taking into consideration 3.7% of $H_2O$. Calculated: C 64.8%, H 4.8%, N 6.9%, S 5.2%. Found: C 64.0%, H 4.6%, N 6.8%, S 5.2%.

EXAMPLE 6

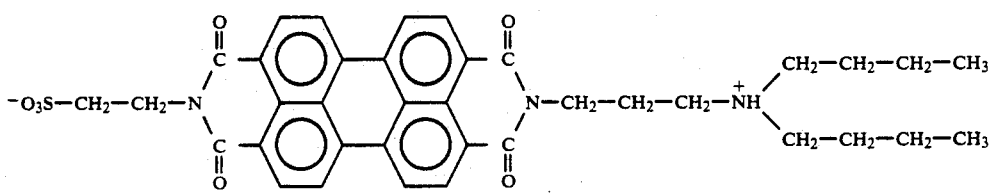

tassium chloride solution and dried at 80° C.

The residue obtained is then first introduced at 25° C. into 100 g of 100% sulfuric acid and dissolved therein. A further 260 g of 12.5% sulfuric acid are then added dropwise to this solution, during which the temperature may rise to 80° C. The mixture is then allowed to cool to 25° C.; the precipitated salt is filtered off with suction through a sintered glass crucible, washed with 10% sulfuric acid, washed neutral with water and dried at 80° C.

Yield: 5.14 g of a compound having the abovementioned formula V and containing 3.7% of water of crystallization, which corresponds to 5.20 g of 100% pure compound (=88.0% of theory).

Analysis: $C_{32}H_{27}N_3SO_7$. Taking into consideration 3.7% of $H_2O$. Calculated: C 64.3%, H 4.5%, N 7.0%, S 5.4%. Found: C 63.9%, H 4.5%, N 6.9%, S 5.6%.

EXAMPLE 5

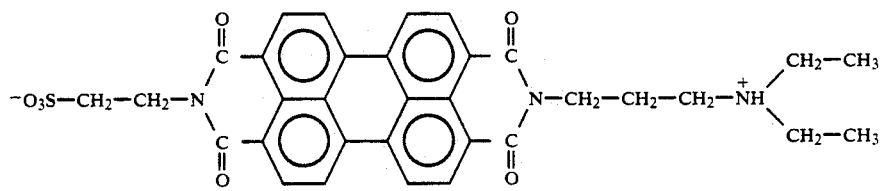

200 ml of water are initially introduced into an autoclave, and 10.0 g of perylene-3,4,9,10-tetracarboxylic monoanhydride mono-β-sulfoethylimide (98.4% pure) and 10.4 g of 3-diethylaminopropylamine are then added. The mixture is then heated to 125° C. and additionally stirred at this temperature for 5 hours. It is then allowed to cool to 25° C., after which the pH thereof is brought to 1.2 by means of 20.3 g of 31% hydrochloric acid. After additional stirring at 25° C. for 1 hour, precipitated salt is finally filtered off with suction, washed neutral with water and dried at 80° C.

50 ml of quinoline are initially introduced into a stirred vessel and 4.99 g of perylene-3,4,9,10-tetracarboxylic monoanhydride mono-β-sulfoethylimide (99.2% pure), 7.5 g of 3-dibutylaminopropylamine and 0.5 g of zinc acetate dihydrate are added in succession. The mixture is then heated to 190° C. and additionally stirred at this temperature for 8 hours. It is then allowed to cool to 120° C., the precipitated product is filtered off with suction, washed with quinoline and methanol and dried at 80° C.

The above residue is then first introduced at 25° C. into 45 g of 100% sulfuric acid and dissolved therein. 50 ml of water are then added dropwise to the solution, during which the temperature is allowed to rise to 80° C. The precipitated salt is then filtered off with suction through a sintered glass crucible, washed with 50% sulfuric acid, washed neutral with water and dried at 80° C.

Yield: 3.94 g of a compound having the abovementioned formula VII which contains 2.1% of water of crystallization, which corresponds to 3.86 g of 100% pure compound (=58.3% of theory).

Analysis: $C_{37}H_{37}N_3SO_7$. Taking into consideration 2.1% of $H_2O$. Calculated: C 66.6%, H 5.6%, N 6.3%, S 4.8%. Found: C 67.3%, H 5.3%, N 6.3%, S 5.3%.

EXAMPLE 7

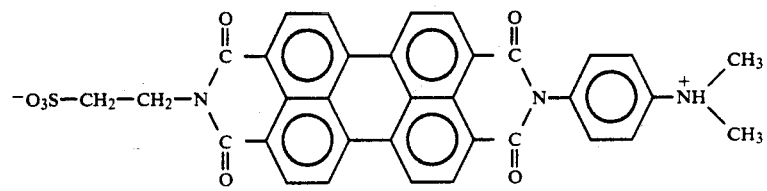

50 ml of quinoline are initially introduced into a stirred vessel and 4.99 g of perylene-3,4,9,10-tetracarboxylic monoanhydride mono-β-sulfoethylimide (99.2% pure), 5.45 g of N,N-dimethyl-p-phenylenediamine and 0.5 g of zinc acetate dihydrate are added in succession. The mixture is then heated to 190° C. and additionally stirred at this temperature for 8 hours. It is then allowed to cool to 25° C., the precipitated product is filtered off with suction, washed with quinoline, methanol and water and dried at 80° C.

The above residue is then first introduced at 25° C. into 70 g of 100% sulfuric acid and dissolved therein. 150 g of 15% sulfuric acid are then added dropwise to the solution, during which the temperature is allowed to rise to 80° C. The precipitated salt is then filtered off with suction through a sintered glass crucible at 25° C., washed with 10% sulfuric acid, washed neutral with water and dried at 80° C.

Yield: 5.55 g of a compound having the abovementioned formula VIII which contains 2.1% of water of crystallization, which corresponds to 5.43 g of 100% pure compound (=88.7% of theory).

Analysis: $C_{34}H_{23}N_3SO_7$. Taking into consideration 2.1% of $H_2O$. Calculated: C 66.1%, H 3.7%, N 6.8%, S 5.2%. Found: C 65.0%, H 4.0%, N 6.5%, S 5.6%.

EXAMPLE 8 through a sintered glass crucible at 25° C., washed with 50% sulfuric acid, washed neutral with water and dried at 80° C.

Yield: 4.10 g of a compound having the abovementioned formula IX which contains 2.0% of water of crystallization, which corresponds to 4.02 g of 100% pure compound (=64.8% of theory).

Analysis: $C_{33}H_{27}N_3SO_8$. Taking into consideration 2.0% of $H_2O$. Calculated: C 63.4%, H 4.3%, N 6.7%, S 5.1%. Found: C 62.6%, H 4.5%, N 6.6%, S 5.8%.

EXAMPLE 9

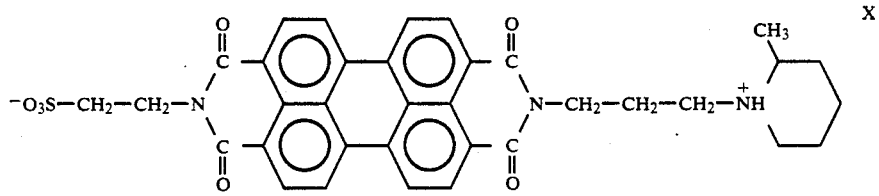

40 ml of 1-(3-aminopropyl)-2-methylpiperidine, 4.99 g of perylene-3,4,9,10-tetracarboxylic monoanhydride mono-β-sulfoethylimide and 0.5 g of zinc acetate dihydrate are introduced in succession into a stirred vessel. The mixture is then heated to 190° C. and additionally stirred at this temperature for 8 hours. It is then allowed to cool to 25° C., the precipitated product is filtered off with suction, washed with methanol and water and dried at 80° C.

The above residue is then first introduced at 25° C. into 70 g of 100% sulfuric acid and dissolved therein. 150 g of 15% sulfuric acid are then added dropwise to

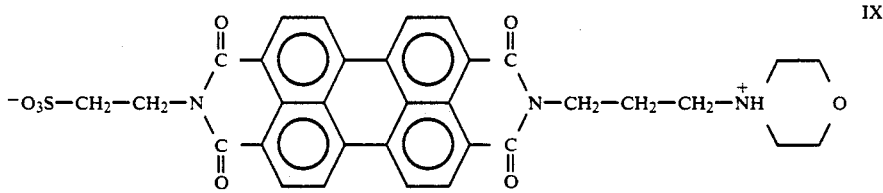

50 ml of quinoline are initially introduced into a stirred vessel and 4.99 g of perylene-3,4,9,10-tetracarboxylic monoanhydride mono-β-sulfoethylimide (99.2% pure), 5.77 g of N-(3-aminopropyl)morpholine and 0.5 g of zinc acetate dihydrate are added in succession. The mixture is then heated to 190° C. and additionally stirred at this temperature for 8 hours. It is then allowed to cool to 25° C., the precipitated product is filtered off with suction, washed with quinoline, methanol and water and dried at 80° C.

The above residue is then first introduced at 25° C. into 50 g of 100% sulfuric acid and dissolved therein. 50 ml of water are then added dropwise to the solution, during which the temperature is allowed to rise to 80° C. The precipitated salt is then filtered off with suction the solution, during which the temperature is allowed to rise to 80° C. The precipitated salt is filtered off with suction through a sintered glass crucible at 25° C., washed with 50% sulfuric acid, washed neutral with water and dried at 80° C.

Yield: 5.19 g of a compound having the abovementioned formula X which contains 2.0% of water of crystallization, which corresponds to 5.09 g of 100% pure compound (=80.5% of theory).

Analysis: $C_{35}H_{31}N_3SO_7$. Taking into consideration 2.0% of $H_2O$. Calculated: C 65.9%, H 4.9%, N 6.6%, S 5.0%. Found: C 65.6%, H 4.8%, N 6.6%, S 5.2%.

EXAMPLE 10

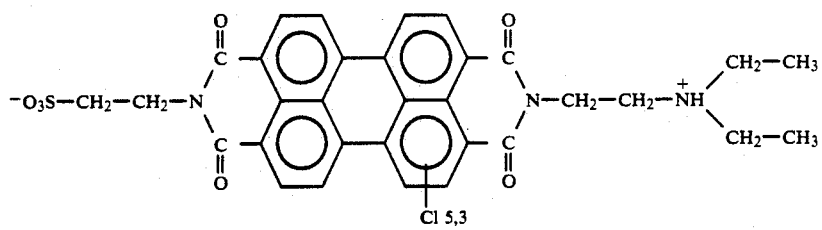

XI 15 g of the perylene compound of the formula III, prepared according to Example 2, are introduced at 25° C. into 450 g of 100% sulfuric acid with stirring and dissolved therein. After addition of 0.6 g of sodium iodide to this solution, 70 g of chlorine are then introduced at 25° C. over a period of 6 hours, another 0.6 g of sodium iodide being added after 3 hours have elapsed. 435 ml of water are then added dropwise to the chlorination mixture at 25° C. with stirring. The resulting precipitated reaction product is filtered off with suction through a sintered glass crucible, washed neutral by treatment with water and dried at 80° C.

Yield: 19.2 g of a compound having the abovementioned formula XI which contains 2.1% of water of crystallization, which corresponds to 18.80 g of 100% pure compound (=95.9% of theory).

Analysis, based on the chlorine content according to formula XI: Taking into consideration 2.1% of H$_2$O. Calculated: C 49.2%, H 2.8%, N 5.4%, S 4.1%, Cl 24.1%. Found: C 48.9%, H 2.8%, N 5.3%, S 3.9%, Cl 24.6%.

The pigment is orange and when incorporated in TSA varnishes produces transparent coatings of high color strength, pure shade and high gloss. The cross-coating fastness is excellent.

EXAMPLE 11

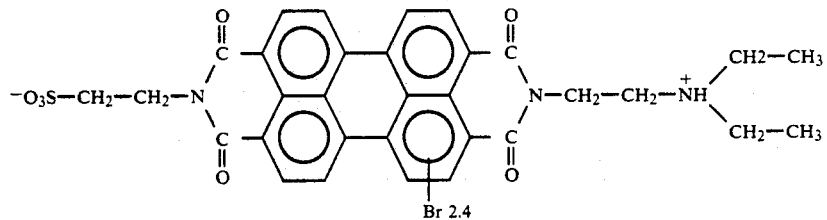

15 g of the perylene compound of the formula III, prepared according to Example 2, are introduced at 25° C. into 450 g of 100% sulfuric acid with stirring and dissolved therein. 6 g of bromine and 0.2 g of iodine are then added to this solution. The bromination mixture is then heated to 125° C. and additionally stirred at this temperature for 6 hours. It is then allowed to cool to 25° C., and 420 ml of water are added dropwise at this temperature. The resulting precipitated reaction product is filtered off with suction through a sintered glass crucible, washed neutral by treatment with water and dried at 80° C.

Yield: 19.3 g of a compound having the abovementioned formula XII which contains 1.4% of water of crystallization, which corresponds to 19.0 g of 100% pure compound (=96.2% of theory).

Analysis, based on the bromine content according to formula XII: Taking into consideration 1.4% of H$_2$O. Calculated: C 48.8%, H 3.1%, N 5.3%, S 4.1%, Br 24.4%. Found: C 48.8%, H 3.2%, N 5.0%, S 3.9%, Br 24.6%.

The pigment is red and when incorporated in TSA varnishes produces transparent coatings of high color strength, pure shade and high gloss. The cross-coating fastness is excellent.

We claim:

1. An inner salt of a perylene compound of the formula

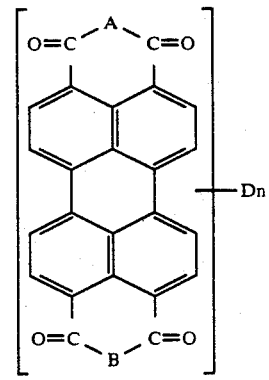

in which

XII

A is

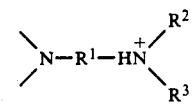

, and

B is

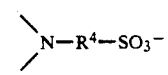

, and n is a value from 0 to 8, and, D is a chlorine or bromine atom or is a combination of a chlorine and bromine atom in which in the above radicals A and B $R^1$ is a $C_2$-$C_6$-alkylene or phenylene.

$R^2$ and $R^3$ individually and independently of one another are each a hydrogen atom, or $C_1$-$C_6$-alkyl but both are not simultaneously hydrogen, or $R^2$ and $R^3$ together with the adjacent nitrogen atom form a pyrrole, imidazoline, imidazole, indole, indoline, benzimidazole, pyrrolidine, piperazine, morpholine or piperidine ring and such a ring system is unsubstituted or substituted with methyl and $R^4$ is $C_1$-$C_6$-alkylene.

2. An inner salt of a perylene compound as claimed in claim 1, wherein $R^1$ is $C_2$-$C_6$-alkylene, $R^2$ and $R^3$, individually and independently of one another, are each $C_1$-$C_6$-alkyl, or $R^2$ and $R^3$ together with the adjacent nitrogen atom form a piperidine, morpholine or imidazole ring, the piperidine ring being unsubstituted or substituted with methyl, and $R^4$ is $C_2$-$C_6$-alkylene.

3. An inner salt of a perylene compound as claimed in claim 2, wherein $R^1$ is ethylene or propylene, and $R^4$ is ethylene or propylene.

4. An inner salt of a perylene compound as claimed in claim 1, wherein in the formula I given there the meanings of A and B are as defined in more detail in claim 1 and n has the value zero.

5. An inner salt of a perylene compound as claimed in claim 1, wherein in the formula I given there the meanings of A and B are as defined in more detail in claim 1, n has a value from 1 to 6 and D is a chlorine or bromine atom or a combination thereof.

6. Method of using an inner salt of a perylene compound of the formula defined in claim 1 as colorant by adding said inner salt to a cellulose ether, cellulose ester, natural resin, or synthetic resin in the form of a moldable plastic, a melt, a spinning solution, a varnish, a paint, or a printing ink.

7. Method of using an inner salt of a perylene compound of the formula defined in claim 1 as pigment dispersant by adding said inner salt to the preparation process of a pigment preparation.

8. Method of using as claimed in claim 7, wherein the pigment of the pigment preparation is a perylene pigment.

9. Method of using a pigment preparation defined as claimed in claim 7 as colorant by adding said pigment preparation to a dispersion process in a melt, a spinning solution, a stoving enamel, or a printing ink.

10. Method of using a pigment preparation defined as claimed in claim 8 by adding said pigment preparation to a dispersion process in a melt, a spinning solution, a stoving enamel, or a printing ink.

* * * * *